B. F. LARE.
TIRE.
APPLICATION FILED JAN. 28, 1911.
1,015,038.
Patented Jan. 16, 1912.
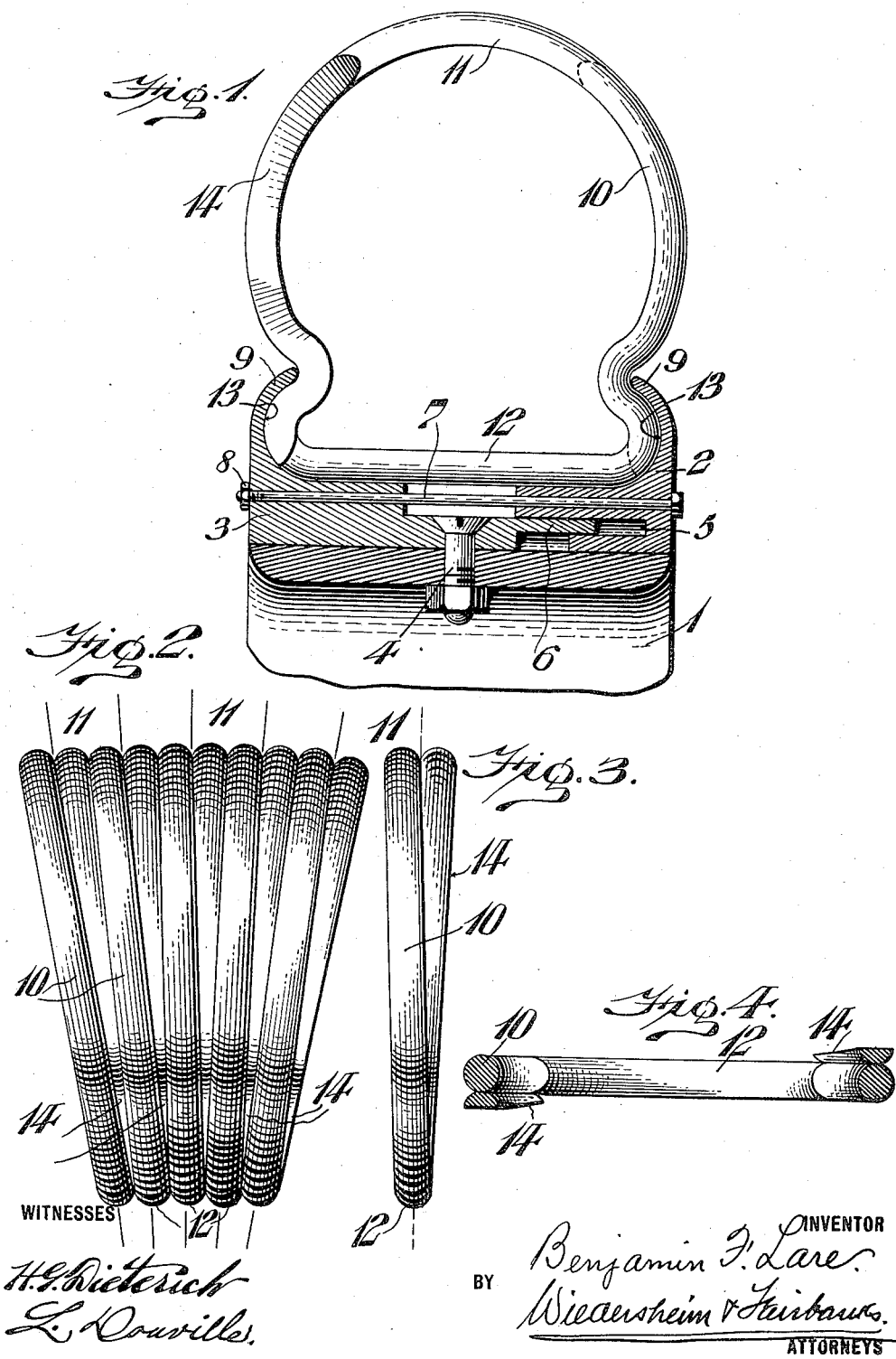

UNITED STATES PATENT OFFICE.

BENJAMIN F. LARE, OF PHILADELPHIA, PENNSYLVANIA.

TIRE.

1,015,038.

Specification of Letters Patent.

Patented Jan. 16, 1912.

Original application filed September 30, 1910, Serial No. 584,658. Divided and this application filed January 28, 1911. Serial No. 605,152.

*To all whom it may concern:*

Be it known that I, BENJAMIN F. LARE, a citizen of the United States, residing in the city and county of Philadelphia, State of Pennsylvania, have invented a new and useful Tire, of which the following is a specification.

This invention relates to vehicle tires and more particularly to a tire for use in connection with bicycles, automobiles or the like and has for an object to produce a tire which is sufficiently resilient to reduce to a minimum the effect of the inequalities of the road bed whereby the jars and shocks are not transmitted to the vehicle and it is also puncture proof and does not depend upon air as a cushioning medium.

Heretofore various pneumatic tire structures have been devised, as I am aware, but tires of this type are open to the objection of being easily punctured by nails, tacks or other sharp objects, whereby they are temporarily or permanently rendered useless.

In my present invention I have devised a tire, preferably formed of a plurality of separate convolutions of wire or the like, suitably coiled and arranged in such a manner that they may be readily attached to a vehicle rim of substantially the ordinary construction and with but very slight changes therein.

It further consists of other novel features of construction, all as will be hereinafter fully set forth.

For the purpose of illustrating my invention, I have shown in the accompanying drawings one form thereof which is at present preferred by me, since the same has been found in practice to give satisfactory and reliable results, although it is to be understood that the various parts of which my invention consists can be variously arranged and organized and that my invention is not limited to the precise arrangement and organization of these parts as herein shown and described.

Figure 1 represents an elevation of a tire embodying my invention, attached to a vehicle rim, the latter being shown in section. Fig. 2 represents a side elevation of a portion of a tire showing a plurality of the convolutions in operative position. Fig. 3 represents a side elevation of a single convolution. Fig. 4 represents a section of one convolution.

Similar numerals of reference indicate corresponding parts in the figures.

Referring to the drawings: 1 designates the felly of a suitable vehicle wheel, the same in the present instance having secured thereto rim sections 2 and 3, each of which extends about the peripheral surface of the felly 1 and forms a complete device adapted to receive and to secure a suitable tire. The rim section 2, in the present instance is positively secured to the felly 1 by means of studs 4 or the like fastening means, suitably spaced apart and positioned about the circumference of the felly, in any well known manner.

5 designates a slot suitably formed in the rim section 2, with which coöperates a tongue 6, preferably formed integral with the rim section 3 and by means of which the telescopic connection is formed between the two rim sections whereby the said sections form a complete unitary rim when secured together in operative position. The securing means for the rim sections, in the present instance, consists of rods 7, passing through the rim sections 2 and 3, from one side to the other and uniting them securely together by means of the nut 8. It will of course be understood that there are a plurality of these rods positioned about the rim and spaced a suitable distance apart. Each rim section is provided, as here shown, with an inwardly turned lip 9, whereby a circumferential channel is formed about the rim and in which a portion of the tire is adapted to fit, by which construction the tire and rim are securely united.

The tire in the present instance consists of a plurality of coiled sections or convolutions 10, each consisting of a tread portion 11 and a rim engaging portion 12, the latter being adapted to seat within the rim structure and having at each end an offset 13 at each side to fit within and be engaged by the inturned lips 9. These convolutions are preferably of spring material, the ends 14 of which terminate on opposite sides of the tread portion whereby the said tread portion is made up of two laterally disposed thicknesses of material while the rim engaging portion is formed of but a single thickness. It will further be noted that the said ends 14 extend toward the rim engaging section and are preferably curved on the same radius as that of the convolutions of which they form a part and these ends are tapered. This tapering of the ends 14 forms planes of the edges of each section, which are oppositely inclined with respect to a radial plane in order that the sections, when placed upon the wheel, may abut one another properly and form, by reason of the said inclination of the edges, a double thickness at the tread portion, forming a substantially continuous tread for the tire. This construction, when in place upon the rim, forms a tire as shown in side elevation Fig. 2, the convolutions of which fit closely and snugly together and the tapering edges of which convolutions rest in contact with the next adjacent coil.

It will now be apparent that I have devised a simple and effective spring tire formed of a number of sections or convolutions, any one of which may be readily removed or replaced without necessitating a complete disassembling of the tire.

Attention is directed to the fact that this application is a division of application Serial No. 584,658, filed Sept. 30, 1910, for tire for vehicle wheels and the improvements herein described and claimed are shown and described in the previous application, this case being filed in accordance with the Office practice.

Having thus described my invention, what I claim as new and desire to secure by Letters Patent, is:

1. A spring section for a tire consisting of a coil formed of a convolution of spring material, the ends of which terminate upon opposite sides of the tread whereby two abutting portions of the material form a continuous tread of the section, and said ends extending toward the rim and abutting the sides of the next adjacent sections.

2. A spring section for a tire consisting of a coil formed of a convolution of spring material, the ends of which terminate upon opposite sides of the tread whereby two portions of the material form the tread of the section, and said ends being curved in the same radius as the convolution.

3. A spring section for a tire consisting of a coil formed of a convolution of spring material, the ends of which terminate upon opposite sides of the tread whereby two portions of the material form the tread of the section, and said ends being tapered.

4. A spring section for a tire consisting of a coil having a tread portion and a rim engaging portion, formed of a convolution of spring material, the ends of which pass each other at the tread section and extend upon opposite sides thereof and said ends being tapered, whereby the planes of the edges of the section are oppositely inclined to a radial plane.

BENJAMIN F. LARE.

Witnesses:
C. D. McVay,
F. A. Newton.

Copies of this patent may be obtained for five cents each, by addressing the "Commissioner of Patents, Washington, D. C."